A. WEBER.
MECHANICAL GEAR SHIFTING DEVICE.
APPLICATION FILED FEB. 10, 1916.
1,264,234.
Patented Apr. 30, 1918.
4 SHEETS—SHEET 1.
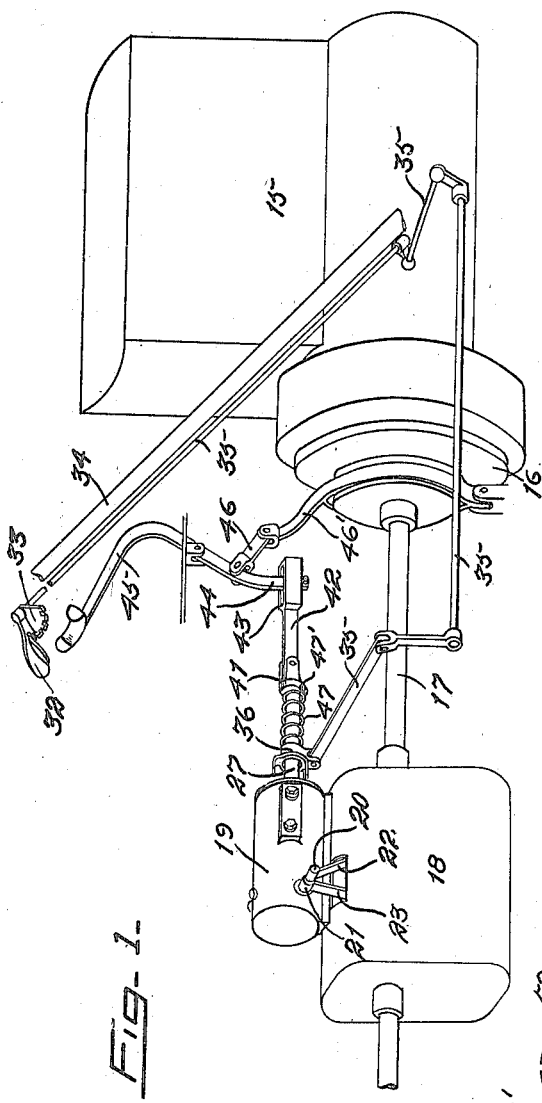
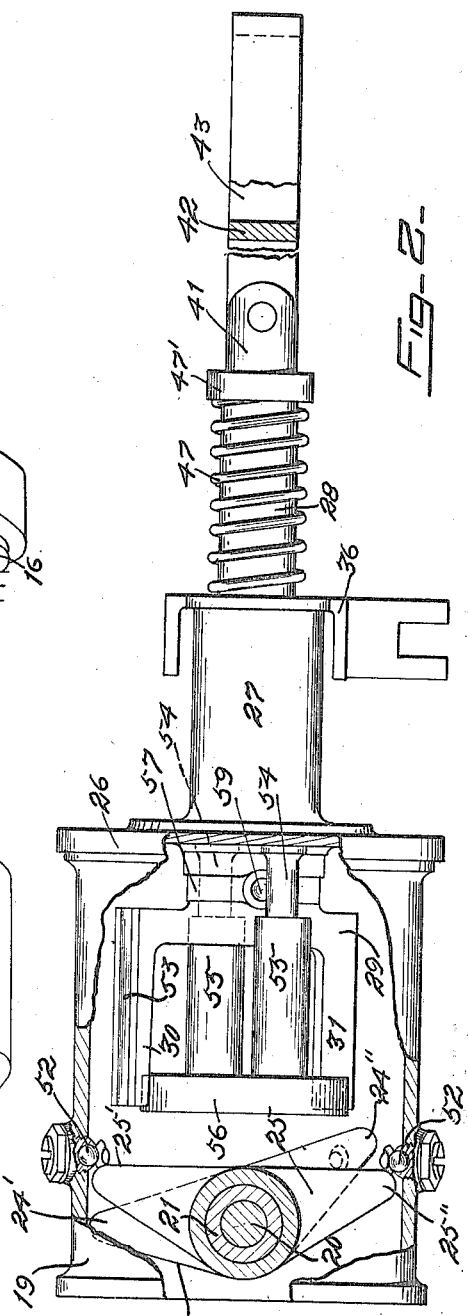
WITNESS
INVENTOR.
Anton Weber
BY
Acker & Totten
ATTORNEYS.

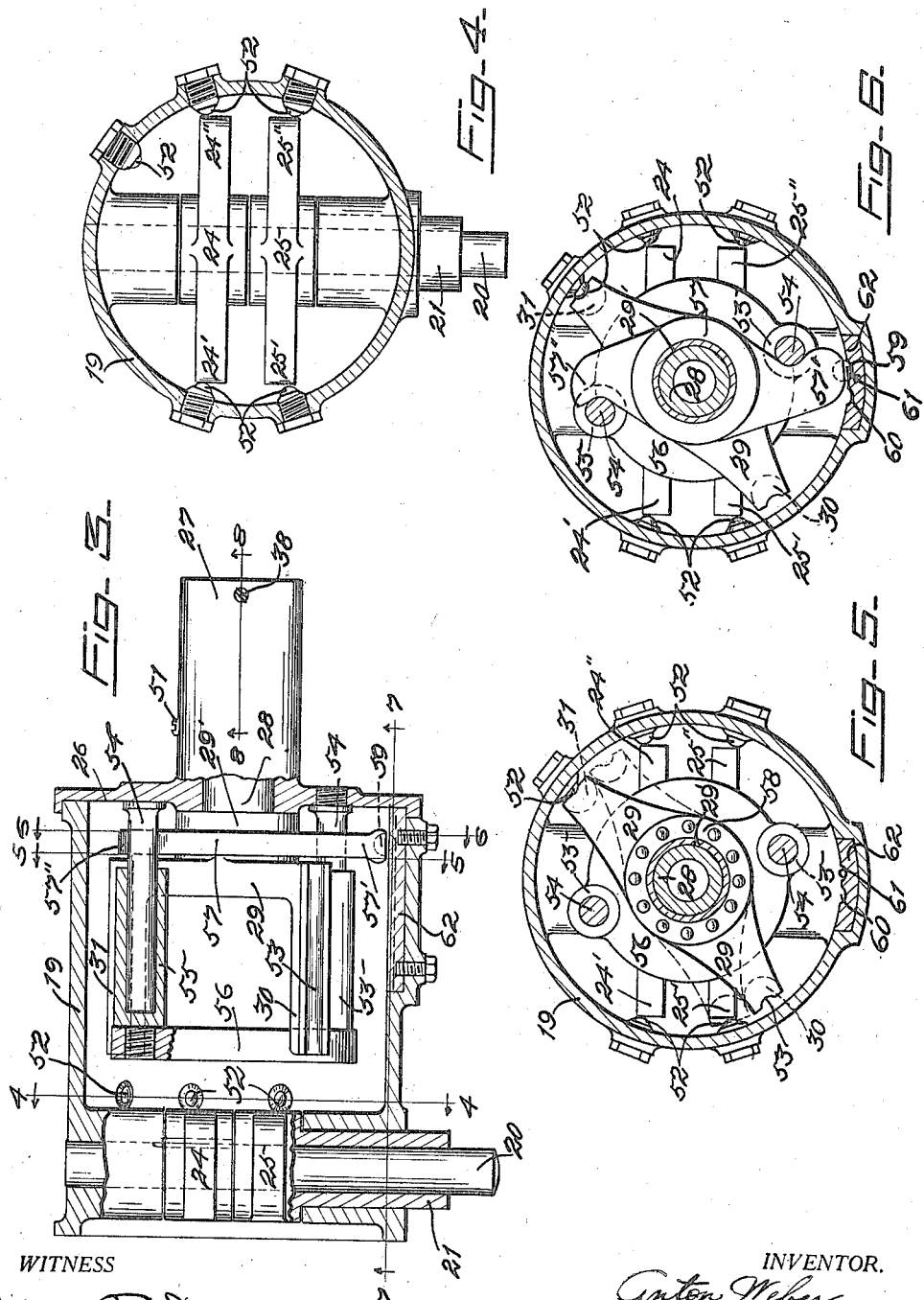

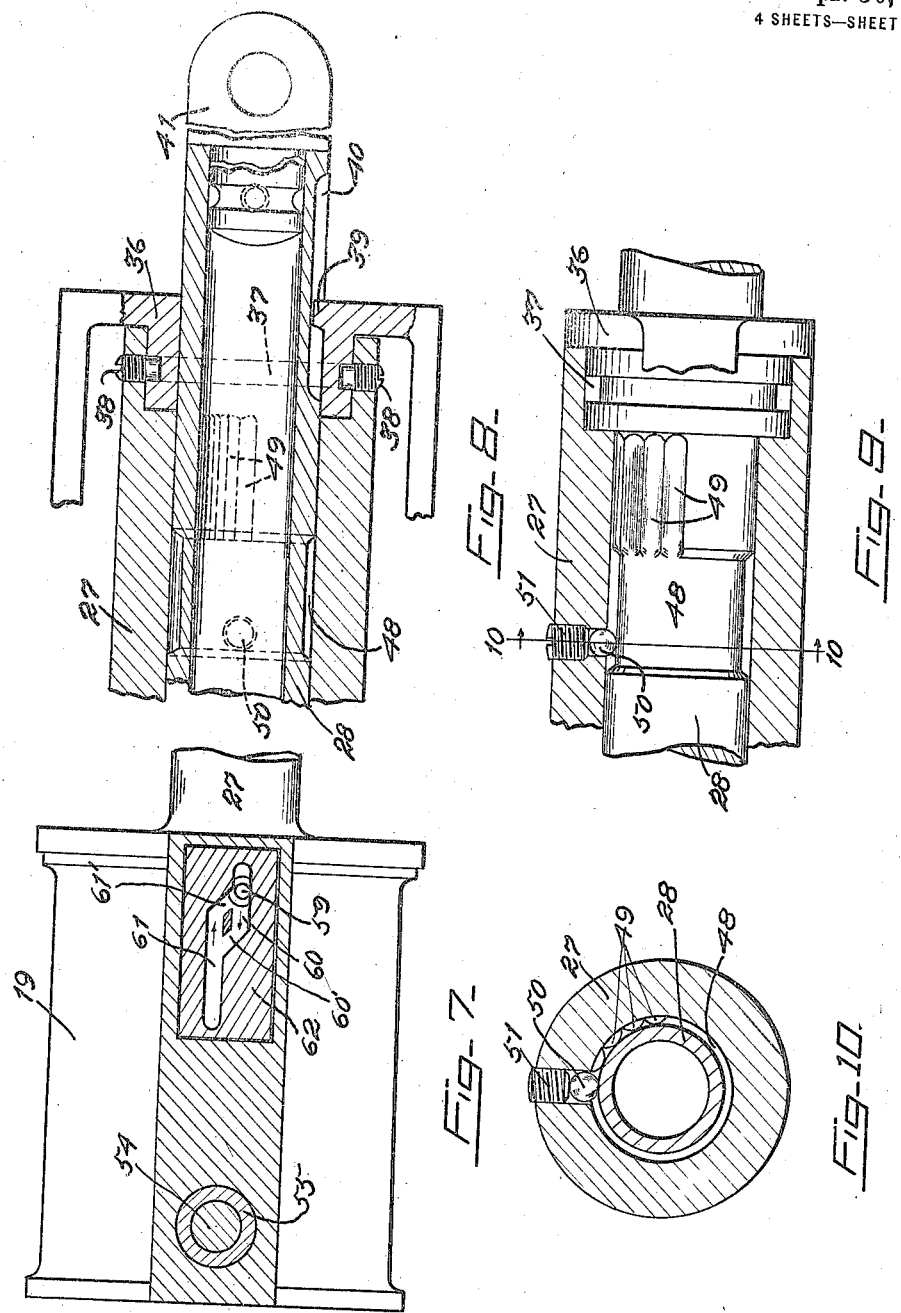

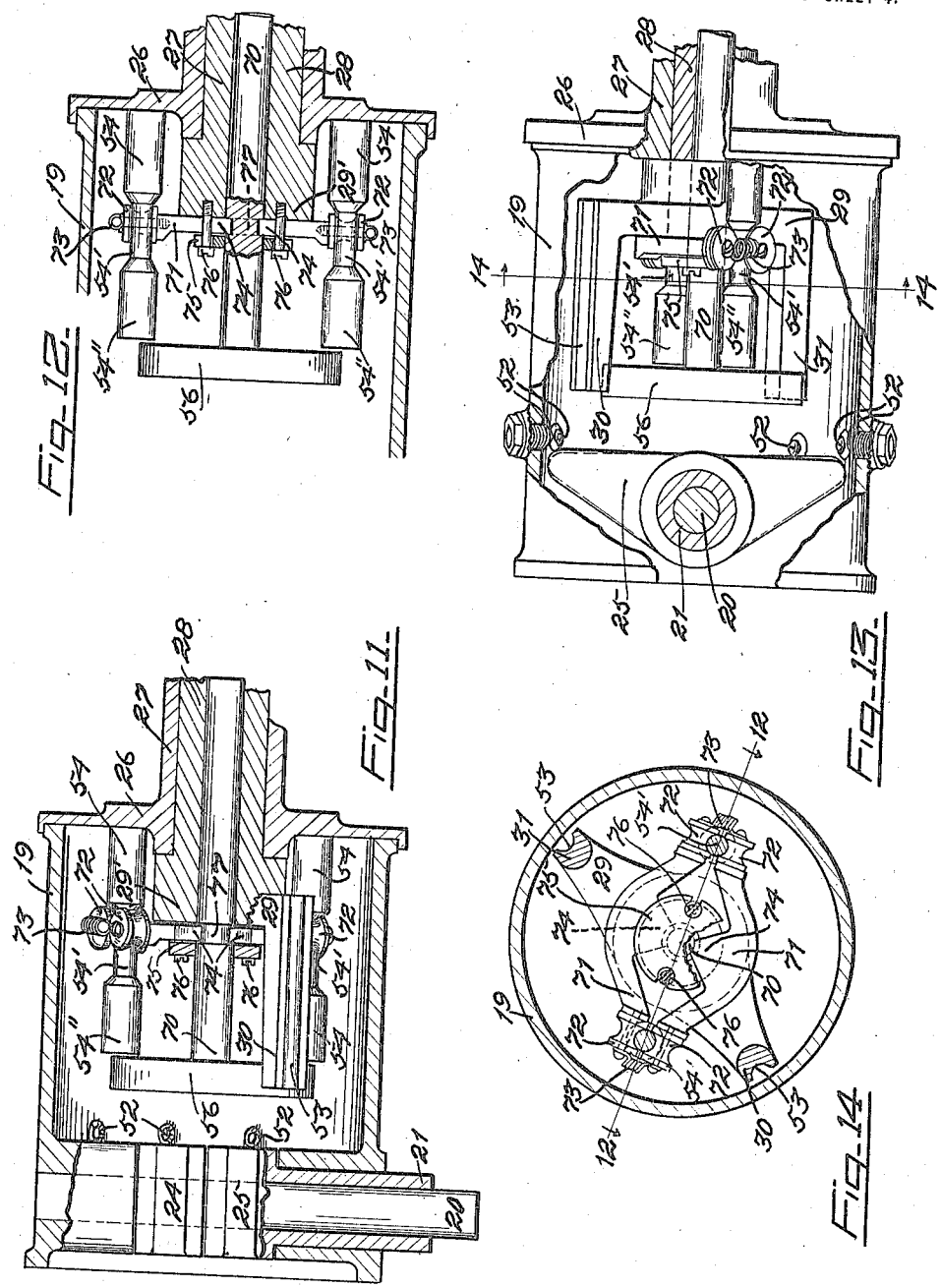

UNITED STATES PATENT OFFICE.

ANTON WEBER, OF OAKLAND, CALIFORNIA.

MECHANICAL GEAR-SHIFTING DEVICE.

1,264,234.   Specification of Letters Patent.   Patented Apr. 30, 1918.

Application filed February 10, 1916. Serial No. 77,381.

*To all whom it may concern:*

Be it known that I, ANTON WEBER, a citizen of the United States, residing at Oakland, in the county of Alameda and State of California, have invented certain new and useful Improvements in Mechanical Gear-Shifting Devices, of which the following is a specification.

The present invention relates to a mechanical gear-shifting device for motor vehicles, and has for its object the provision of means for shifting the variable speed transmission gears by the same operation which controls the driving clutch.

The device is particularly applicable to motor vehicles of the commonly known type, in which the power, generated in a motor, is transmitted through a driving clutch and a variable speed transmission mechanism, usually comprising intermeshing gears, to the driving wheels. In such vehicles, the transmission mechanism is usually set in the desired position by means of a manually operated lever. This is unsatisfactory, especially where the transmission mechanism comprises one of the well known forms of sliding gear devices, for the reason that the operator must use considerable skill in the consecutive and almost simultaneous operation of the clutch-pedal and gear-lever, to avoid undue clashing of the gears.

The present device therefore simplifies the operation of such motor vehicles, by providing means for releasing the clutch and shifting the gears at one operation, the selecting of the desired gear combination being done previously at any convenient time. Moreover, on account of the relatively greater amount of force which the operator is able, by his position, to exert upon the clutch-pedal, he can shift the gears by this means more quickly and therefore more successfully, than by hand.

In order to comprehend the invention, reference should be had to the accompanying drawings, wherein—

Figure 1 is a diagrammatic elevation showing the mechanical gear-shifter as applied to a motor vehicle power plant of a commonly used type.

Fig. 2 is a part-sectional elevation of the gear-shifting device.

Fig. 3 is a part-sectional plan of the same.

Fig. 4 is a vertical section taken on the line 4—4 of Fig. 3, and viewed in the direction of the arrows.

Fig. 5 is a vertical section taken on the line 5—5 of Fig. 3, and viewed in the direction of the arrows.

Fig. 6 is a vertical section taken on the line 6—6 of Fig. 3, and viewed in the direction of the arrows.

Fig. 7 is a longitudinal section taken on the line 7—7 of Fig. 3, and viewed in the direction of the arrows.

Fig. 8 is a sectional detail, enlarged, taken on the line 8—8 of Fig. 3, and viewed in the direction of the arrows.

Fig. 9 is a part-sectional view of the parts shown in Fig. 8 and taken at right angles thereto.

Fig. 10 is a transverse section taken on the line 10—10 of Fig. 9, and viewed in the direction of the arrows.

Fig. 11 is a part-sectional plan, similar to Fig. 3, showing a modified form of the gear-shifting device.

Fig. 12 is a part sectional view taken in the direction of the arrows on the line 12—12 of Fig. 14, showing the modified form, certain parts being omitted for the sake of clearness.

Fig. 13 is a part sectional elevation, similar to Fig. 2, of the modified form.

Fig. 14 is a transverse section taken on the line 14—14 of Fig. 13, and viewed in the direction of the arrows.

In the drawings, and referring more particularly to Fig. 1 thereof, wherein is shown one arrangement of the device, the reference numeral 15 represents an engine or motor, from which power is transmitted through a clutch mechanism 16 and a shaft 17 to a variable speed transmission mechanism 18. Mounted upon the housing of said transmission mechanism 18 is a cylindrical shell or case 19, from which projects a rotatable transversely disposed rod 20 and a rotatable concentric sleeve 21. To the projecting ends of this rod 20 and sleeve 21 are respectively fixed depending arms 22 and 23, which extend into the transmission gear case 18, and by the fore and aft movement of their lower ends shift the gears in any well known manner.

The concentric shafts 20 and 21 extend across within the shifter case 19, and carry therewithin the spaced transversely disposed double levers 24 and 25 respectively, Figs. 2, 3 and 4 of the drawings. These double levers are so connected to the shiftable gears within the gear-case 18, by the shafts and levers described, that rearward movement of any one of the ends 24', 24'', 25' or 25'' of either of said levers 24 or 25, as shown at 24' in Fig. 2, results in the engagement, within said gear-case 18, of one set of power-transmitting gears, and that when said levers are in their central positions, as illustrated in Fig. 3 of the drawings, the power-transmitting gears are in inoperative, or so-called neutral position. The device herein illustrated has provision for engaging four different sets of power-transmitting gears, this being the number most commonly employed; but it is obvious that this number need not be so limited.

The forward end of the shifter case 19 is closed by an end plate 26, carrying a forwardly extending hub 27, within which is slidably and rotatably mounted a longitudinally disposed shaft 28. This shaft carries on its inner end a forked ram member 29, having two longitudinally disposed rearwardly extending arms 30 and 31,—Figs. 2, 3, 5 and 6 of the drawings, set slightly less than 180 degrees apart, so that by the rotation of the shaft 28, said arms may be successively brought into alinement with the ends 24', 24'', 25' and 25'' of the levers 24 and 25. Thus rotation of the ram member 29 from the neutral position shown in full lines in Fig. 5 of the drawings, to the position shown in dotted lines, brings the arm 30 into alinement with the ends 25' of the lever 25; further rotation of the ram 29 brings the arm 31 into alinement with the end 24'' of the lever 24, the arm 30 lying between the lever ends 25' and 24'; further rotation successively brings the arm 30 into alinement with the lever end 24', and the arm 31 into alinement with the lever end 25''.

In any one of these positions, a rearward longitudinal movement of the ram 29 will move one of the levers 24 or 25, and thereby shift the power-transmitting gears as previously described. Thus the shaft 28 is rotated to select the desired gear-combination to be engaged, and moved longitudinally to effect the actual shifting of the gears into said desired combination. The shaft 28 may be rotated by any convenient means, which for the purpose of illustration is shown in Fig. 1 of the drawings as comprising a lever 32 working over a notched quadrant 33 mounted upon the steering post 34 of the vehicle, and operating through a system of rods, levers and links 35, connected with a collar 36 rotatably mounted in the end of the hub 27 of the shifter case 19. This collar 36 is provided with an annular groove 37, Figs. 8 and 9 of the drawings, into which set screws 38 project to prevent longitudinal movement of said collar, while permitting rotary movement thereof. The collar is also provided with an interiorly projecting key 39, which engages a key-way 40 in the ram shaft 28, so that the rotation of said collar is transmitted to said shaft, while longitudinal movement of the shaft within the collar is permitted.

The ram shaft 28 is moved longitudinally by the following means:—A head 41, Fig. 8 of the drawings, is rotatably carried by the outer or forward end of said shaft, and is connected with a slotted link 42, Fig. 1 of the drawings, into the slot 43 of which extends the lower end 44 of the usual clutch operating pedal lever 45. This pedal is indicated as connected with the clutch 16 through a link 46 and a yoke 46' in such manner that forward movement of the upper end of said pedal first causes the release of the clutch 16, and then, when the lower end 44 reaches the end of the slot 43 in the link 42, further movement of said pedal moves the ram shaft 28 rearwardly to shift the power-transmitting gears as before described. When the pedal 45 is released, to allow the clutch 16 to again engage, the ram shaft 28 is retracted by a spring 47 acting against a collar 47' on said shaft. Thus after each shift the ram 29 is returned to its normal forward position.

In order to insure that the ram, in its rearward travel, will follow accurately the proper path to enable one of its arms 30 or 31 to engage the desired shifting lever, a guide is provided within the hub 27 of the case 19. The diameter of the ram shaft 28 is relieved at this point, as shown at 48, in Figs. 8, 9 and 10 of the drawings, for a distance corresponding to the distance through which the arms 30 and 31 must be moved before engaging a shifting lever. For a further distance, corresponding to the distance through which the ram is moved after engaging the shifting lever, a series of parallel longitudinal grooves 49 are cut in the shaft 28. A ball guide 50, secured in the wall of the hub 27 by a screw 51, is adapted to enter any one of said grooves 49 to retain the shaft 28 in proper angular position. In addition to the above described guide, ball guides 52 are provided in the wall of the case 19, Figs. 2 to 6 of the drawings, and the outer surfaces of the arms 30 and 31 are grooved, as shown at 53, to engage with and travel over said balls 52. Thus these balls 52 serve not only as guides, but also as supports for the arms 30 and 31 to prevent outward distortion of the latter when pressure is exerted thereby against the shifting levers 24 and 25.

To prevent more than one combination of power-transmitting gears being thrown into engagement at the same time, resetting means are provided for throwing said gears out of engagement, or into neutral position, before each shift is made. Fixed to the end plate 26 of the shifter case 19 are a pair of rearwardly extending rods 54—Figs. 2, 3, 5, and 6 of the drawings, upon which are slidably mounted sleeves 55, and said sleeves carry a resetting head 56 of such size as to lie within the ram arms 30 and 31. A double-armed dog 57 is rotatably mounted in a groove in the hub 29' of the ram 29, preferably between two thrust bearings, one of which is shown at 58 in Fig. 5 of the drawings. This dog 57 carries two radially extending arms 57' and 57'', adapted to lie against the fixed rods 54 and to engage the ends of the sleeves 55, as shown in Figs. 3 and 6 of the drawings. The arm 57' of said dog 57 is extended into proximity with the wall of the case 19, and carries in its end a ball guide 59 adapted to follow a series of grooves 60 and 61, Figs. 3, 5, 6 and 7 of the drawings, in a block 62 secured to said case 19.

The dog 57, being mounted on the hub of the ram 29, must travel with said ram in its fore and aft, or longitudinal movement. When the ram is in its forward, or normally retracted position, the ball-guide 59 lies within the groove 60, as in Fig. 7 of the drawings, and holds the ends 57' and 57'' of the dog 57 in engagement with the ends of the sleeves 55. Therefore rearward, or inward movement of the ram 29 and the dog 57 carries therewith the sleeves 55 and the resetting plate 56 attached thereto. Said plate comes into contact with any one of the lever ends 24', 24'', 25' or 25'' which may be projecting, and forces the same into neutral position. For example, in Fig. 2 of the drawings, the lever end 24' has been moved rearwardly by the ram arm 30, and the ram has returned to its normal position. The opposite end 24'' of the lever 24 is therefore projecting forwardly, as shown, and will be engaged and forced back to neutral position by the resetting plate 56.

When the plate 56 has been moved rearwardly by the dog 57 sufficiently to return the projecting lever end to its neutral position, the ball guide 59 in the end 57' of the dog 57 reaches the oblique groove 60', Fig. 7 of the drawings, and follows said groove into the longitudinal groove 61. This produces sufficient rotation of the dog 57 to free its ends from the ends of the sleeves 55, and thus the resetting plate 56 is released. Further movement of the ram 29 moves one of the shifting lever ends 24', 24'', 25' or 25'', (depending upon the angular position of said ram) rearward. The corresponding forward movement of the opposite end of the said shifted lever 24 or 25, returns the resetting plate 56 to its normal position. During the return movement of the ram and the dog 57, the ball guide 59 thereof follows the longitudinal groove 61 to its end, and then by following the oblique groove 61', rotates the dog 57 to its normal position in which it may engage the sleeves 55 on its next rearward stroke.

A modified form of resetting mechanism is shown in Figs. 11, 12, 13 and 14 of the drawings. In this case, the ram shaft 28 is hollow, and has slidably mounted therewithin a rod 70, which carries the resetting plate 56 upon its inner end. The fixed rods 54 are formed as shown with relatively small sections 54', and larger sections 54'' near their ends. A pair of spaced yokes 71 extend across between the two fixed rods 54, and carry on their ends rollers 72 adapted to follow the surfaces of said rods. Springs 73 hold said rollers against said rods, and hold the yokes 71 together. Said yokes 71 have inwardly projecting fingers 74, which are loosely retained between the hub 29' of the yoke 29 and a spaced annular plate 75 secured thereto by screws 76, Fig. 12 of the drawings. The resetting rod 70 is formed with a transverse groove 77, into which the fingers 74 of the yokes 71 may project when the rollers 72 are traveling upon the reduced portions 54' of the fixed rods 54.

The operation of this modified form of resetting mechanism is as follows:—In the normal position of the parts, the fingers 74 of the yokes 71 engage the slot 77 in the resetting rod 70, as shown in the drawings. Rearward movement of the ram therefore carries the resetting head 56 therewith. When said head has moved sufficiently to effect the resetting of the shifting lever 24 or 25, the rollers 72 ride up onto the enlarged portions 54'' of the fixed rods 54, thereby separating the yokes 71, and withdrawing the fingers 74 thereof from the slot 77. The resetting head 56, thus released, is returned to normal position by the outwardly moving end of the lever 24 or 25 actuated by the ram, and when said ram is returned to normal position, the rollers 73, riding upon the reduced portions of the fixed rods 54, permit the fingers 74 of the yokes 71 to again drop into the slot 77 in the resetting rod 70.

It is to be noted that on account of the length of the slot 43, and the distance through which the ram 29 must be moved before engaging one of the shifting levers 24 or 25, the driving clutch may be partially released without affecting the gear-shifting device, and that said clutch is entirely released by the time the actual shifting is accomplished.

Moreover, assuming that the clutch is released, the gears may be shifted from one combination to another, or into neutral position, without entirely engaging said clutch.

The invention has herein been described and illustrated in the form preferred for it use in connection with motor-vehicle power plants of the most common type, but it is obvious that it may be modified to adapt it to other conditions, without in any way affecting the principles of the invention. I therefore do not wish to limit myself in this regard, but on the contrary wish to be construed as claiming the invention as broadly as the art will permit.

Having thus described my invention, what I claim as new and desire to protect by Letters Patent is:—

1. In combination with a variable speed power-transmitting mechanism, a mechanical shifting device therefor comprising a plurality of shifting members connected with the shiftable elements of said mechanism, a movable ram member having a plurality of arms and adapted to be moved to position one of said arms in operative relation with respect to any one of said shifting members, means for longitudinally moving said ram to cause the arm thereof to engage and actuate the shifting member operatively related thereto, and means carried by said ram and positioned between the arms thereof for resetting said shifting members into normal position prior to the actuating of the said alined shifting member.

2. In combination with a clutch mechanism and a variable speed power-transmitting mechanism connected therewith, a mechanical shifting device for the latter comprising a plurality of shifting members connected with the shiftable elements of said power-transmitting mechanism, a movable ram member mounted in proximity thereto, means for moving said ram selectively into operative relation with any one of said shifting members, a common means for disengaging said clutch and moving said ram to actuate the shifting member in operative relation therewith, resetting mechanism carried by said ram and operated thereby for placing all of said shifting members in normal position prior to the actuating of the member operatively related to said ram and devices for releasing said resetting mechanism from operative engagement with said ram when said shifting members are reset to normal position.

3. In combination with a variable speed power-transmitting mechanism, a mechanical shifting means therefor comprising a plurality of movable shifting devices connected with the shiftable elements of said mechanism, a single ram having a plurality of arms and adapted to be rotated to position one of said arms in alinement with any one of said shifting devices, means for longitudinally moving said ram to cause the arm thereof to engage and actuate the shifting device in alinement therewith, and means associated with said ram for resetting said shifting devices into normal position prior to the actuating of the said alined shifting device.

4. In combination with a variable speed power-transmitting mechanism, a mechanical shifting means therefor comprising a plurality of movable shifting devices connected with the shiftable elements of said mechanism, a ram having a plurality of arms and adapted to be rotated to position one of said arms in alinement with any one of said shifting devices, means for longitudinally moving said ram to cause the arm thereof to engage and actuate the shifting device in alinement therewith, and a resetting plate carried within the arms of said ram for returning said shifting devices to normal position prior to the actuating of the said alined shifting device.

5. In combination with a variable speed power-transmitting mechanism, a mechanical shifting means therefor, comprising a plurality of movable shifting levers connected with the shiftable elements of said mechanism, a ram having a plurality of arms and adapted to be rotated to position one of said arms in alinement with any one of said shifting levers, means for longitudinally moving said ram to cause the arm thereof to engage and actuate the shifting lever in alinement therewith, and a resetting plate positioned within the arms of said ram and adapted to be moved thereby to return said shifting levers to normal position prior to the actuating of the said alined shifting lever.

6. In combination with a variable speed power-transmitting mechanism, a mechanical shifting means therefor, comprising a plurality of movable shifting levers connected with the shiftable elements of said mechanism, a ram adapted to be positioned in alinement with any one of said shifting levers, means for longitudinally moving said ram to engage and actuate the shifting lever in alinement therewith, a resetting device for returning said shifting levers to normal position prior to the actuating of the said alined shifting lever, and means associated with said ram for engaging said resetting device and moving the same therewith in one direction only.

7. In combination with a variable speed power-transmitting mechanism, a mechanical shifting means therefor, comprising a plurality of movable shifting levers connected with the shiftable elements of said mechanism, a ram adapted to be positioned in alinement with any one of said shifting levers, means for longitudinally moving said ram to engage and actuate the shifting lever in alinement therewith, a resetting device for returning said shifting levers to normal position prior to the actuating of the said alined shifting lever, means associated with said ram for moving said resetting device, and means for releasing the same when said shifting levers are reset to normal position.

8. In combination with a variable speed power-transmitting mechanism, a shifting device therefor comprising a plurality of shifting levers connected with the shiftable members of said mechanism, a ram member adapted to be rotated into operative relation with any one of said shifting levers, means for moving said ram in said rotated position to actuate the operatively related shifting lever, devices for resetting said shifting levers to normal position prior to the actuating of any one thereof by said ram, and means associated with said ram for engaging and carrying said resetting devices therewith for a portion of the stroke thereof.

9. In combination with a variable speed power-transmitting mechanism, a shifting device therefor comprising a plurality of shifting levers connected with the shiftable members of said mechanism, a ram member adapted to be rotated into operative relation with any one of said shifting levers, means for moving said ram in said rotated position to actuate the operatively related shifting lever, devices for resetting said shifting levers to normal position prior to the actuating of any one thereof by said ram, a dog movably associated with said ram for engaging and carrying said resetting devices therewith for a portion of the stroke thereof, and means for moving said dog to release said resetting devices when said shifting levers are reset.

10. In combination with a variable speed power-transmitting mechanism, a shifting device therefor comprising a plurality of shifting levers connected with the shiftable members of said mechanism, a ram member adapted to be rotated into operative relation with any one of said shifting levers, means for moving said ram in said rotated position to actuate the operatively related shifting lever, devices for resetting said shifting levers to normal position prior to the actuating of any one thereof by said ram, a dog rotatably mounted upon said ram for engaging and carrying said resetting devices therewith for a portion of the stroke thereof, and a fixed guide for causing said dog to rotate out of engagement with said resetting devices when said shifting levers are reset.

11. In combination with a variable speed power-transmitting mechanism, a shifting device therefor comprising a plurality of shifting levers connected with the shiftable members of said mechanism, a rotatable and longitudinally movable ram member mounted in proximity thereto, means for rotating said ram when in its inoperative longitudinal position, to bring the same into operative relation with any one of said shifting levers, means for longitudinally moving said ram to actuate the operatively related shifting lever, and guiding devices for preventing the rotation of said ram during its engagement with said shifting lever.

12. In combination with a variable speed power-transmitting mechanism, a shifting device therefor comprising a plurality of shifting members connected with the shiftable elements of said mechanism, a movable ram member mounted in proximity thereto, means for moving said ram selectively into operative relation with any one of said shifting members, means for moving said ram to actuate the operatively related shifting member, and guiding devices for preventing the selective movement of said ram during its engagement with said shifting member.

In testimony whereof I have signed my name to this specification in the presence of two subscribing witnesses.

ANTON WEBER.

Witnesses:
F. L. CARSON,
D. B. RICHARDS.